May 5, 1970  K. WILFERT  3,510,150
INFLATABLE CUSHION INSTALLATION FOR INCREASING THE SAFETY
OF VEHICLE PASSENGERS
Filed Sept. 15, 1967

INVENTOR
KARL WILFERT

BY *Craig & Antonelli*

ATTORNEYS

United States Patent Office 3,510,150
Patented May 5, 1970

---

3,510,150
INFLATABLE CUSHION INSTALLATION FOR INCREASING THE SAFETY OF VEHICLE PASSENGERS
Karl Wilfert, Gerlingen-Waldstadt, Germany, assignor to Daimler-Benz Aktiengesellschaft, Stuttgart-Unterturkheim, Germany
Filed Sept. 15, 1967, Ser. No. 668,103
Claims priority, application Germany, Sept. 15, 1966, D 51,102
Int. Cl. B60r 21/00
U.S. Cl. 280—150       10 Claims

ABSTRACT OF THE DISCLOSURE

An installation for enhancing the safety of the passengers in passenger motor vehicles which are equipped with pneumatically effective paddings and which includes protective elements, preferably inflatable only during danger, arranged to the rear and to the sides of the heads of the vehicle passengers and approximately matched to the shape of their heads whereby the protective elements are secured at relatively fixed parts of the motor vehicle on the inside of the passenger space. Additional, preferably inflatable devices may be provided also along the side walls and below the instrument panel to further protect the passengers against accidents.

BACKGROUND OF THE INVENTION

The present invention relates to an installation for increasing the safety of the passengers of vehicles which are equipped with pneumatically operable paddings or cushions.

Safty installations are known in the prior art in connection with motor vehicles in which air-filled cushions or paddings are provided (German Pat. 836,748) in order to reduce during accidents the dangerous impact effect of bo ly parts of the vehicle passengers against the body pa ts or instrument-panel parts present on the inside of the vehicle space. No matter how advantageous these paddings or cushions of the vehicle interior space may be, they are able to reduce only the force of an impact of body parts; however, they are not able to prevent the impact itself. However, it has been discovered that in particular with the presently customary vehicle velocities on high-speed roads or the like and with the large impact energy which occurs at these velocities during an accident, any lifting of the body of the passenger out of the seat thereof and any impact against the interior wall of the vehicle space has to be precluded beforehand.

In order to achieve this, it is also known in the prior art to utilize so-called safety belts which hold fast the body of the passenger in the seat. Since the fastening and the wearing of the belt is connected with certain annoyances, installations were also proposed heretofore (German Pat. 896,312), in which elastic containers are arranged in front of the passenger which are inflated in a fraction of a second in case of an accident by compressed air and thus either retain the passenger in the seat thereof or at least prevent that the passenger is thrown forwardly.

However, all of the known safety installations of this type entail the disadvantage that the heads of the passengers are not adequately protected. In particular, it has been found that collison accidents involve fatal consequences because the heads of the vehicle passengers, though held with their bodies in the seats thereof, for example, by safety belts, were snapped off in particular laterally or toward the rear by reason of the inertia effect.

SUMMARY OF THE INVENTION

The present invention is concerned with the aim to avoid these disadvantages and to offer a protection in particular for the heads of the vehicle passengers. The present invention essentially consists in that small iarbag or air-cushion protective elements predominantly arranged to the rear of the heads of the vehicle passengers, preferably inflatable only in case of danger and matched to the head shape are provided, which are secured at the body and/or at the extended frame structures of the backrests. A particularly advantageous construction of the air-cushion protective elements results if the elements, filled iwth air, extend in the shape of a semi-circle laterally and to the rear of the heads of the vehicle passengers and also project upwardly over the heads. In this manner the capacity and freedom for action on the part of the passengers is not impaired prior to the occurrence of an accident whereas during an accident the air-cushion protective elements prevent, on the one hand, the dangerous snapping or bending off of the heads toward the sides or toward the rear and, on the other, also form a sort of protective wall about the head. Head injuries may thus be avoided far-reachingly which might result, for example, by the crushing of the roof.

A favorable construction of the present invention results if the air-cushion protective elements are mounted at the inner wall of the body by way of tension members such as belts, nets, or cables, etc. In that case, provision may be made that the belts or cables for the fastening of the air-bag or air-cushion protective elements for the heads of the passengers seated in front are secured within the area of the forward door column and/or within the area below the instrument panel at the center tunnel or the like because in this manner an arrangement is achieved which impairs as little as possible the freedom of movement of the vehicle passengers.

Another construction of the present invention, which is also favorable, is obtained if the air-bag or air-cushion protective elements are secured directly at the extended frame structures of the seat backrests by way of support grids or support frames matched approximately to the head shape. This construction offers the advantage that no tension members or the like have to be provided within the vehicle space. However, it goes without saying, the first type of construction permits that the capacity for action and movement of the heads of the vehicle passengers cannot be impaired at all prior to the occurrence of an accident by portions projecting beyond the frame structures of the backrests as is also the case with the customary vehicles known to date.

It is appropriate if additionally the parts endangered for the vehicle passengers during accidents such as door columns, roof rims, instrument panel edges, etc. are protected in a conventional manner by spatially limited air-cushion protective elements and if these air-cushion protective elements are constructed along the interior space walls of the vehicle in the manner of a continuous wall.

Accordingly, it is an object of the present invention to provide an installation for the protection of the heads of the vehicle passengers which avoids by extremely simple and operationally reliable means the aforementioned shortcomings and drawbacks encountered in the prior art.

Another object of the present invention resides in an installation for increasing the safety of the vehicle passengers which is capable of significantly reducing the impact in case of accidents.

A further object of the present invention resides in a safety installation for passenger motor vehicles which protects in particular the heads of the passengers against impact injuries in case of collision accidents.

A still further object of the present invention resides in a safety installation for passenger motor vehicles which not only assures that the passengers remain seated in case of accidents but additionally assures that no head injuries occur as a result of impact by the heads of the passengers against the inner walls of the passenger space.

A still further object of the present invention resides in a safety installation for passenger motor vehicles under normal driving conditions, does not impair the capacity of the passengers to move and act freely in the customary manner.

A further object of the present invention resides in a motor vehicle safety installation which far-reachingly protects the heads of the passengers against injuries caused by the tremendous decelerating forces that occur as a result of an impact collision at high velocities.

Another object of the present invention resides in a safety installation for passenger motor vehicles which is simple in construction, can be readily installed into new as well as existing vehicles and can be adapted to the particular type of vehicle used without any great difficulty.

Still another object of the present invention resides in a safety installation for passenger motor vehicles which protects the heads of the passengers also against injuries which might occur during crushing of the roof for instance, when the vehicle rolls over.

These and further objects, features, and advantages of the present invention will become more obvious from the following description when taken in connection with the accompanying drawing which shows, for purposes of illustration only, two embodiments in accordance with the present invention; and wherein.

Figure 1:
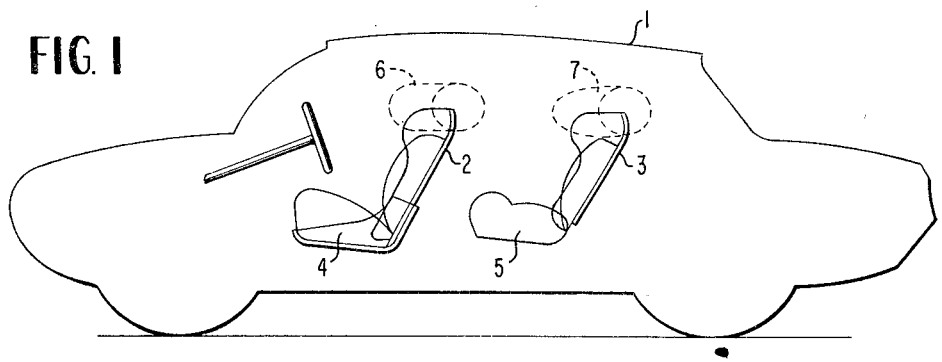
FIG. 1 is a schematic side elevational view, in cross section through the interior space of a passenger motor vehicle constructed in accordance with the present invention.

Referring now to the drawing wherein like reference numerals are used through the various views to designate like parts, and more particularly to FIG. 1, reference numeral 1 designates therein the schematically indicated motor vehicle body of any conventional construction. A respective air-bag or air-cushion protective element 6 and 7, which is constructed in a tube-like or hose-like manner, is placed in a semi-circular shape about the upper edge of the backrests 2 and 3 within the area of the upper end of the backrests 2 and 3, of the front seats 4 and of the rear seats 5, respectively. The shape of the air-cushion protective elements 6 and 7, which may be of any conventional, known construction, is thereby so chosen that, as can be seen from FIGS. 2a and 2b, the contour of the inflated air-cushion protective elements will match the shape of the heads 8 and 9 of the vehicle passengers, respectively.

Figure 2A:
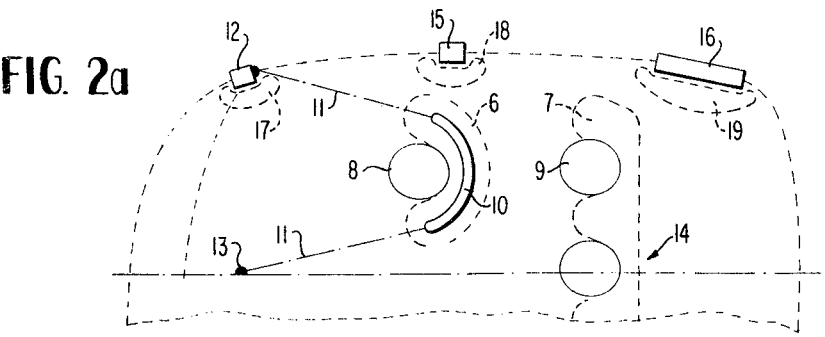
FIG. 2a is a partial schematic view on the right-hand side of the passenger space of a passenger motor vehicle constructed in accordance with the present invention.

FIG. 2a illustrates an embodiment in which the forward air-cushion protective element 6 is retained by a support element 10 which is secured by way of the tension members 11, on the one hand, within the area of the door column 12 and, on the other, at the point 13 within the area of the center tunnel or any corresponding floor area of the vehicle interior space.

Figure 2B:
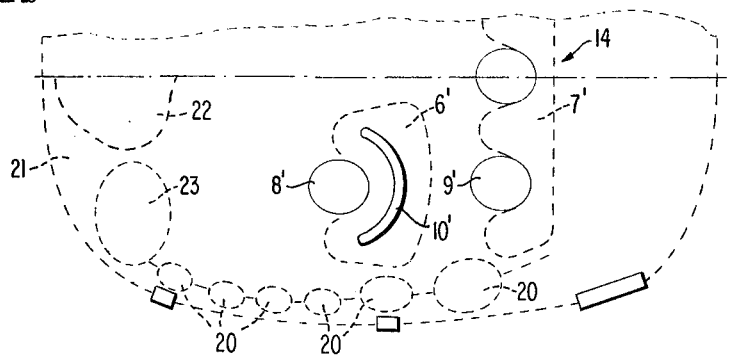
FIG. 2b is a partial schematic plan view, similar to FIG. 2a, on the left-half of a passenger space of a modified passenger motor vehicle constructed in accordance with the present invention.

The air-cushion protective element 7, as can be seen from FIGS. 2a and 2b is constructed in the illustrated embodiments as an air-cushion or padding strip extending uninterruptedly over the entire rear seat bench 14 and having three indentations for three passengers seated in the rear.

During the drive, the air-cushion protective elements 6 and 7 which, as mentioned hereinabove, may be of any conventional construction, are not filled with air so that they do not require any significant amount of space and thus cannot impair the action and movement capacity of the heads 8 and 9 of the vehicle passengers. The tension members 11 which are displaced laterally of the seats, do not cause any substantial impairment since they extend within the area in which are disposed, for example, in case of bucket-seats, the arm rests so that possibly with a corresponding construction they might even enable an agreeable seating. In case of an impact of the vehicle, the air-cushion protective elements 6 and 7 are filled with compressed air in a fraction of a second by means of automatically operated control devices of any conventional construction having fast-responding valves, which are actuated, for example, by an excessive pressure on the steering wheel and/or by control elements responsive to excessive inertia effects. Since such automatic control installations are known in the prior art and are also readily within the scope of any person skilled in the art, forming no part of the present invention, a detailed description thereof is dispensed with herein. The protective elements 6 and 7, once automatically inflated, then offer an excellent protection for the heads of the passengers and thereby contribute considerably to the increase of the so-called "inner safety."

Provision may also be made in accordance with the present invention that additional air-cushion protective elements 17, 18 and 19 are mounted in any conventional manner on the inside of the door columns 12 and/or on the inside of the center column 15 and/or of the rear column 16 which are actuated, e.g., automatically inflated in the same manner as the protective elements 6 and 7. A higher degree of space utilization for the passenger space can be achieved in this manner as compared to an equivalent padding which is secured constantly on the inside of the vehicle passenger space.

In the embodiment of FIG. 2b, the air-cushion protective element 7' which will place itself about the heads 9' of the passengers seated in the rear seat, is constructed in an analogous manner as the protective element 7 of FIG. 2a. However, at the front seat in this embodiment, the air-cushion protective element 6' is secured with the aid of the frame structure 10' directly at the upper edge of the backrest 2 of the seat, not visible in FIG. 1. This frame structure 10', again of any conventional, known construction, is matched approximately to the shape of the head 8' of the forwardly seated passenger so that also in this case during the occurrence of an accident, the air-cushion protective element 6' to be inflated under those circumstances, will be placed laterally and to the rear of the head 8' of the passenger and will also extend over the head with a corresponding construction. Of course, it is also understood that the protective elements 6 and 7 of FIG. 2a may also be so constructed as to project over the heads of the passengers when inflated. Furthermore, in lieu of the individual air-cushions 17, 18 and 19 illustrated in FIG. 2a, in the embodiment of FIG. 2b several individual air-cushion protective elements 20 are combined into a type of safety wall at the sides of the passenger space. In this manner, the advantage is realized that is case of an accident not only the columns carrying the roof are padded softly within the passenger space but also the places at which normally no padding at all can be accommodated, for example, at the windows. It is possible, for example, to secure the air-cushion protective elements 20 at the lower edge and at the upper edge of the side windows. However, it is also within the purview of the present invention to distribute the air-cushion protective elements 20 by way of nets or the like over the entire side wall of the vehicle in case of a collision.

In the embodiment of FIG. 2b, additional larger air-cushion protective elements 22 and 23 are also provided below the instrument panel 21 which are inflated in case of an accident and thus can far-reachingly prevent injuries at the legs of the forwardly seated passengers, for instance, in case of a crushing or compressing of the forward wall of the passenger space.

While I have shown and described two embodiments in accordance with the present invention, it is understood that the same is not limited thereto, but is susceptible of numerous changes and modifications as known to a person skilled in the art.

I claim:

1. An installation for increasing the safety of passengers in motor vehicles, comprising inflatable cushions adapted to be inflated in emergency conditions, said cushions, when inflated, being disposed at least laterally and to the rear of the heads of passengers within the vehicle and being constructed in the form of relatively small semi-circular members matched to the shape of the heads of the passengers, wherein said inflatable cushions also extend over the heads of the passengers, wherein said securing means includes tension means secured at the inner wall of the vehicle body, at locations disposed forwardly of said cushions.

2. An installation according to claim 1, wherein the tension means are belts.

3. An installation according to claim 1, wherein said tension means are cables.

4. An installation according to claim 1, wherein said tension means are nets.

5. An installation according to claim 1, wherein said tension means for the protective elements for the heads of the forward passengers are secured within the area of the forward door columns and within the area below the instrument panel at the center tunnel.

6. An installation according to claim 5, further comprising spatially limited additional protective elements in the form of additional inflatable cushions for cushioning additional parts of the motor vehicle which are potentially dangerous to passengers during collisions.

7. An installation according to claim 6, wherein said additional parts include door columns, roof rims, and instrument panel edges.

8. An installation according to claim 7, wherein said additional protective elements are arranged at the interior space walls in the manner of a continuous wall.

9. An installation according to claim 8, wherein relatively larger protective elements in the form of air-cushions are arranged below the instrument panel which are adapted to be inflated in case of danger and offer a protection for the legs of the passengers.

10. An installation according to claim 9, further comprising control means for automatically filling said inflatable cushions, in case of danger, with compressed air.

References Cited

UNITED STATES PATENTS 2,834,606   5/1958   Bertrand _____ 280—150

KENNETH H. BETTS, Primary Examiner

U.S. Cl. X.R.

297—391